Feb. 18, 1936.  L. E. PADELFORD ET AL  2,031,330
BROILER OR THE LIKE
Filed Nov. 18, 1931  5 Sheets-Sheet 1

INVENTORS
Lester E. Padelford &
BY   Walter H. Rudolph

ATTORNEY.

Feb. 18, 1936.      L. E. PADELFORD ET AL      2,031,330
BROILER OR THE LIKE
Filed Nov. 18, 1931        5 Sheets-Sheet 2

INVENTORS.
Lester E. Padelford &
BY  Walter H. Rudolph
Joseph Harley
ATTORNEY.

Feb. 18, 1936.  L. E. PADELFORD ET AL  2,031,330
BROILER OR THE LIKE
Filed Nov. 18, 1931  5 Sheets-Sheet 3

INVENTORS
Lester E. Padelford &
BY  Walter H. Rudolph

ATTORNEY.

Feb. 18, 1936.                L. E. PADELFORD ET AL                2,031,330
                                  BROILER OR THE LIKE
                                  Filed Nov. 18, 1931          5 Sheets-Sheet 4

INVENTORS
Lester E. Padelford &
BY  Walter H. Rudolph
       Joseph Farley
                ATTORNEY.

Patented Feb. 18, 1936

2,031,330

UNITED STATES PATENT OFFICE 2,031,330

BROILER OR THE LIKE

Lester E. Padelford and Walter H. Rudolph,
Buffalo, N. Y.

Application November 18, 1931, Serial No. 575,834

11 Claims. (Cl. 126—41)

This invention relates to broilers, and has for its principal object the provision of a new and improved and compact construction for a broiler of neat and attractive appearance particularly adapted for use in restaurants, cafeterias, soda fountains, or similar establishments, as well as for domestic use.

Another important object of the present invention is to provide a device of the character described adapted for the rapid broiling of meats, such as steaks, chops, chicken, fish or other foodstuffs.

Another object is to provide a broiler with a food retaining grid that is movable into and out of the cooking compartment by the manipulation, with a minimum of effort, of a lever or other manually operable handle conveniently located exteriorly of the cooking compartment.

A further object is to provide a device in which there is operatively associated with the manually operable handle, or with the parts operated thereby, a means for automatically controlling the amount of heat supplied to the cooking compartment and another object is to so construct such means that the heat will be automatically controlled in accordance with the thickness of the food to be cooked.

A further object is to provide a cooking compartment in which a plurality of heating units of any suitable type are associated with radiant heaters to heat the latter and so that a maximum heating effect is obtained within the compartment in the region occupied by the foodstuffs by the convergence of direct and radiant heat and through which region is also passed a convection current of air admitted into the bottom of the compartment immediately below the grids to be heated as it passes upward through the compartment, said convection current passing through the zone of maximum convergence of the radiant heat rays and over the surfaces of the foodstuffs to offset excessive heating and burning or scorching thereof.

A further object is to so construct the device that a serving plate may be placed beneath the cooking compartment so as to catch any meat juices that drip from the meat during the broiling thereof and at the same time so that the plate will be warmed from the heat of the cooking compartment.

And a further object is to construct a device in which the food retaining grids will be subject to the heat of the cooking compartment only when the device is in actual operation.

The above and other objects, such as providing a device in which there will be a minimum of fuel consumption, a minimum of heat dispersion into the surrounding atmosphere, a minimum of smoke created and the providing of a device which is of simple and sturdy construction capable of being manufactured at a low cost will appear more fully from the following more detailed description and by reference to the accompanying drawings forming a part hereof wherein;

As shown in the drawings, the device is supported upon a pair of legs 20 located one at each side of and secured at their upper ends to, the bottom of the oven. These legs are so constructed as to provide an open space at the front end of the device into which a serving plate may be inserted to lie immediately below the cooking compartment. The cooking compartment 21 is defined between a pair of insulating pads 22 of asbestos or other suitable material. Suitably secured to the inner faces of the pads 22 are a pair of heat radiants 23 made of suitable refractory material. Located immediately below the radiants 23 is a pair of gas burners 24. The insulating pads 22 are enclosed within an outer casing 18 preferably constructed of sheet metal and consisting of side, end and top members. The top member 25 of the casing is provided with an opening at its upper end about which extends an inwardly projecting flange 26 and 27, said flange serving to hold the pads 22 in position and also cooperating with the grids, presently to be described, to cause the upper ends thereof to be brought into juxtaposition when the grids are lowered into the cooking compartment.

Suitably secured to the outer casing 18 and spaced inwardly from the ends 28 of the casing is a pair of plates 29, (Fig. 5) preferably of insulating material and defining the end walls of the cooking compartment. Each plate 29 is preferably constructed of a pair of similar members spaced apart from each other at the center of the device to provide a vertical slot and the vertical side edge of each plate is preferably covered by a channel shaped piece of sheet metal 30 which serves as a bearing surface and guideway for the grid carrier 31.

Figures 1, 8:
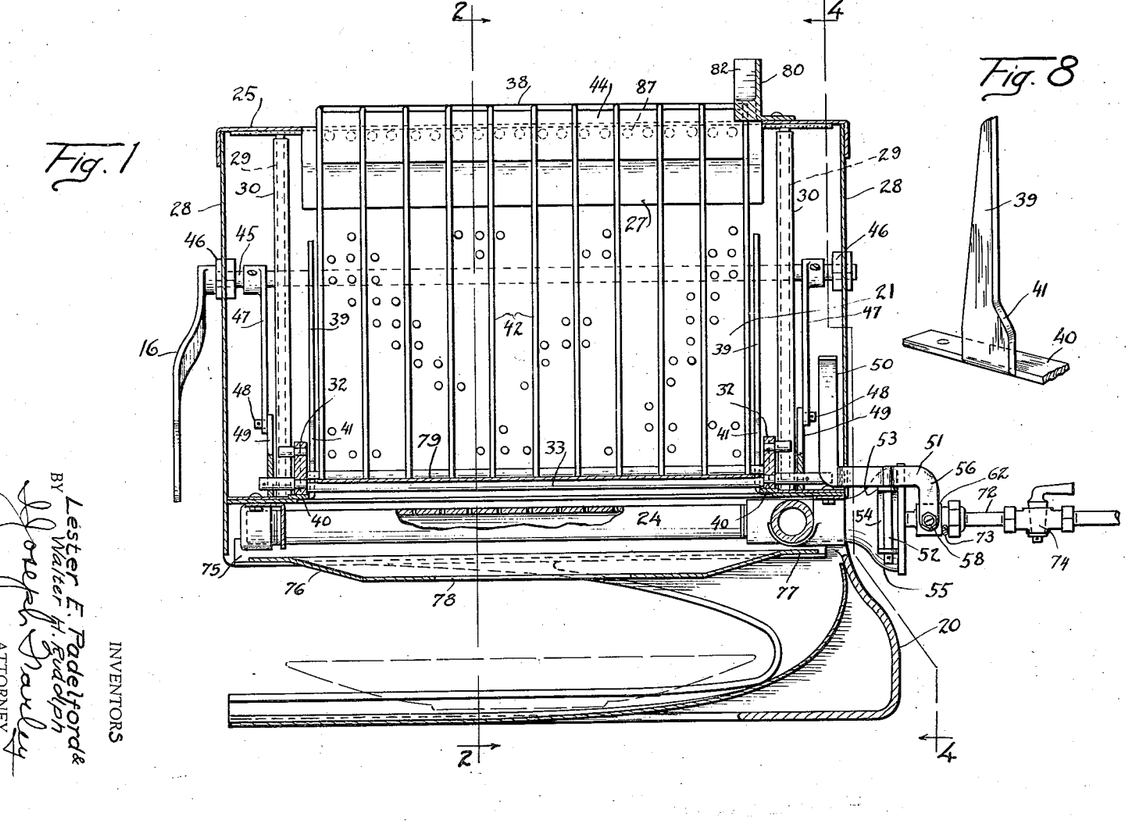
Fig. 1 is a central vertical section taken on the line 1—1 of Fig. 2 through a broiler constructed in accordance with the principles of the present invention.
Fig. 8 is a perspective detail of a bracket which serves as a cam and also to retain the grids in engagement with the grid carrier when they are moved into the cooking compartment.
Figures 2, 12:
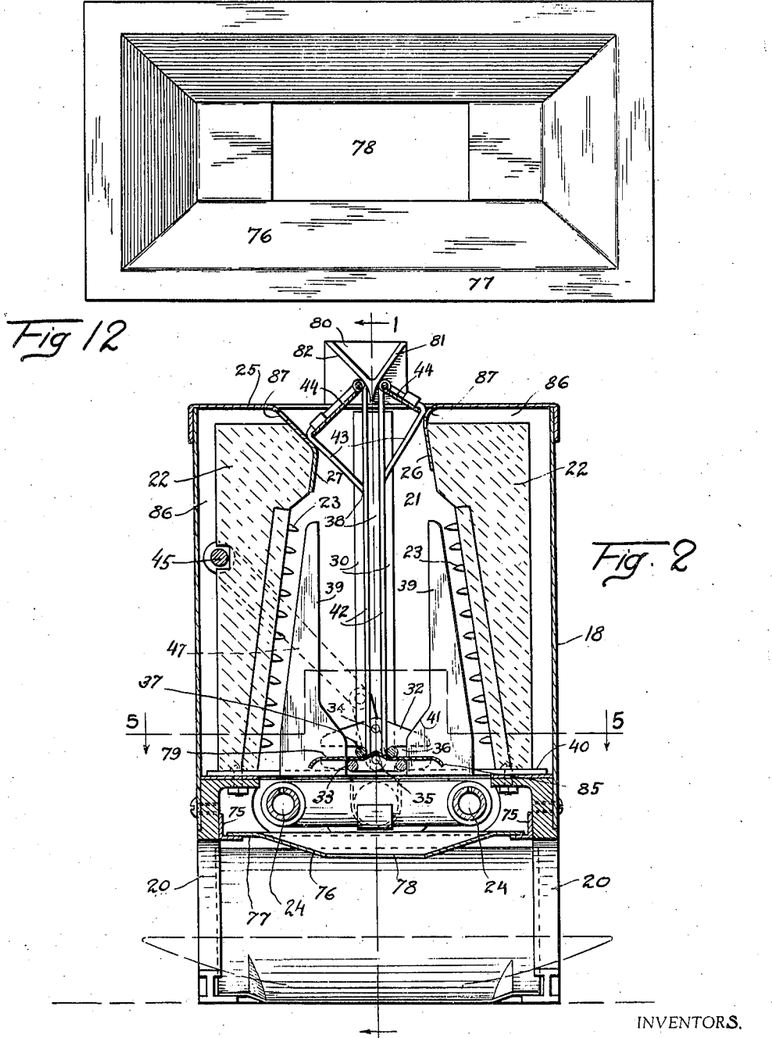
Fig. 2 is a section of the line 2—2 of Fig. 1.
Fig. 12 is a detail plan of a deflector pan for the bottom of the cooking compartment.
Figures 5, 6, 11, 13:
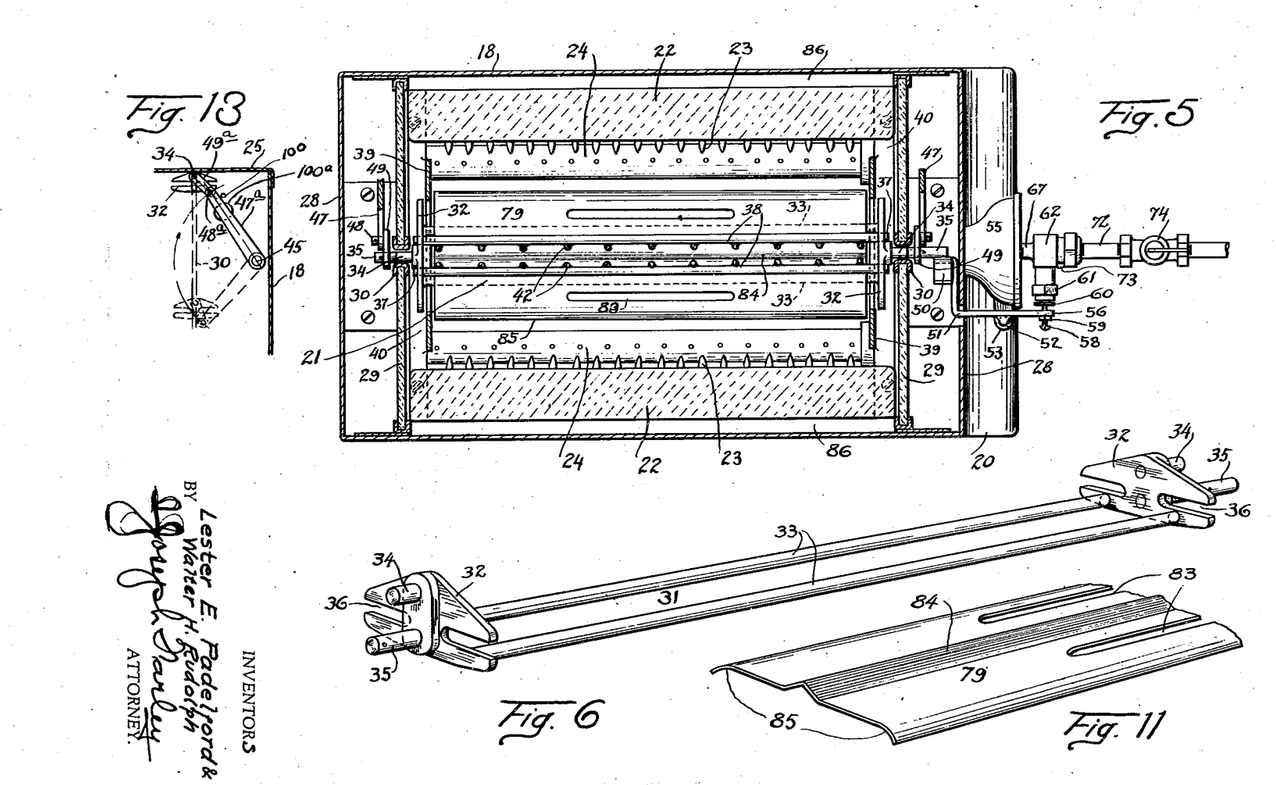
Fig. 5 is a section of the line 5—5 of Fig. 2.
Fig. 6 is a detailed perspective of the vertically movable carrier or slide to which the grids are secured.
Fig. 11 is a perspective detail of a deflector plate carried by the carrier shown in Fig. 6 below the grids.
Fig. 13 is a somewhat diagrammatic side elevation on a reduced scale of a modified construction for the actuating connections to the movable carrier.

The grid carrier 31 (see Fig. 6) consists of a pair of end brackets 32 connected together in spaced relationship by a pair of rods 33. Each bracket 32 is provided with a pair of laterally projecting pins 34 and 35 and also with a pair of horizontally extending open ended slots 36. The slots 36 are adapted to receive the ends of the lower rods 37 of the grids 38. These ends of the rods 37 of the grids are held within the slots 36 by means of vertically extending retaining plates 39, see Figs. 2 and 8, there being a pair of such plates located at each end of the cooking compartment and secured by a lateral flange 40 to the tops of the legs 20. As shown in Figs. 2 and 5, the plates 39 are spaced inwardly a slight distance from the end walls 28 and adjacent to its lower ends each plate 39 is provided with an inclined cam surface 41 for a purpose which will hereinafter be more fully set forth.

The grids 38 which include the vertical rods 42 are carried by the carrier 31 with the projecting ends of the rods 37 located within the slots 36 of the carrying brackets 32. The end vertical rod of each grid is bent around to form a loop 43, see Fig. 7, which is shown as of substantially triangular shape and which cooperates with the flanges 26, 27, to cause the upper ends of the grids to be brought towards each other when the grids are lowered into the cooking compartment.

Each grid 38 preferably has secured to its loop portions 43 a heat deflector plate 44 which serves, when the grids are lowered into the cooking compartment, to provide a closure for the upper end of said compartment and to deflect the heat arising therefrom inwardly towards the food being cooked.

The pins 34, 35 of the brackets 32 project through the vertical guideways 30 at the center of the partitions 29 and said guideways 30 cooperate with the said pins to hold the brackets 32 in a substantially horizontal position when the grids are raised and lowered.

Figure 4:
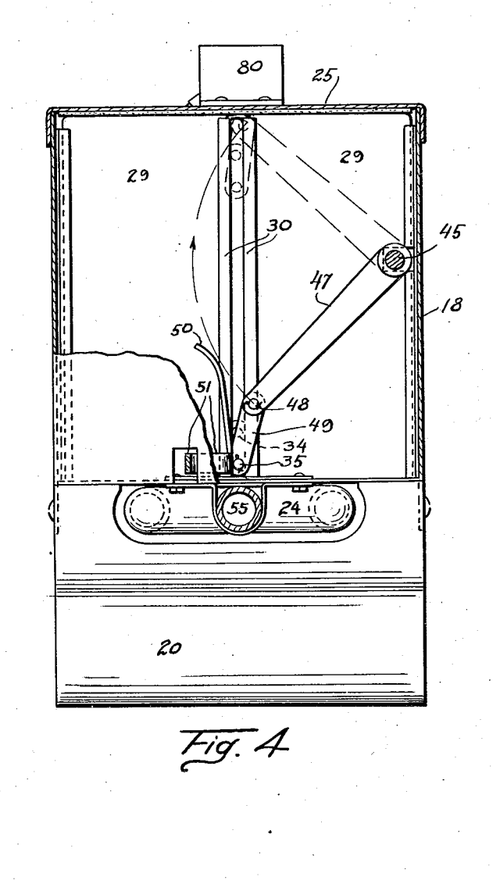
Fig. 4 is a section of the line 4—4 of Fig. 1.

Means are provided for conveniently actuating the grids to raise and lower them, and such means consists of a manually operable handle 16 located at the front end of the device externally thereof and suitably secured to the end of a shaft 45. The shaft 45 is journaled in suitable bearings 46 secured to the end walls 28 of the outer casing. Secured to the shaft 45 and located in the spaces between the partitions 29 and the end walls 28 is a pair of levers 47. Each of these levers is provided at its outer end with a suitable aperture in which is received a pin 48, see Fig. 4 that projects laterally from the upper end of a link 49. The lower end of each link 49 is secured to the lower pin 35 of its adjacent bracket 32 of the grid carrier.

Figures 7, 9, 10:
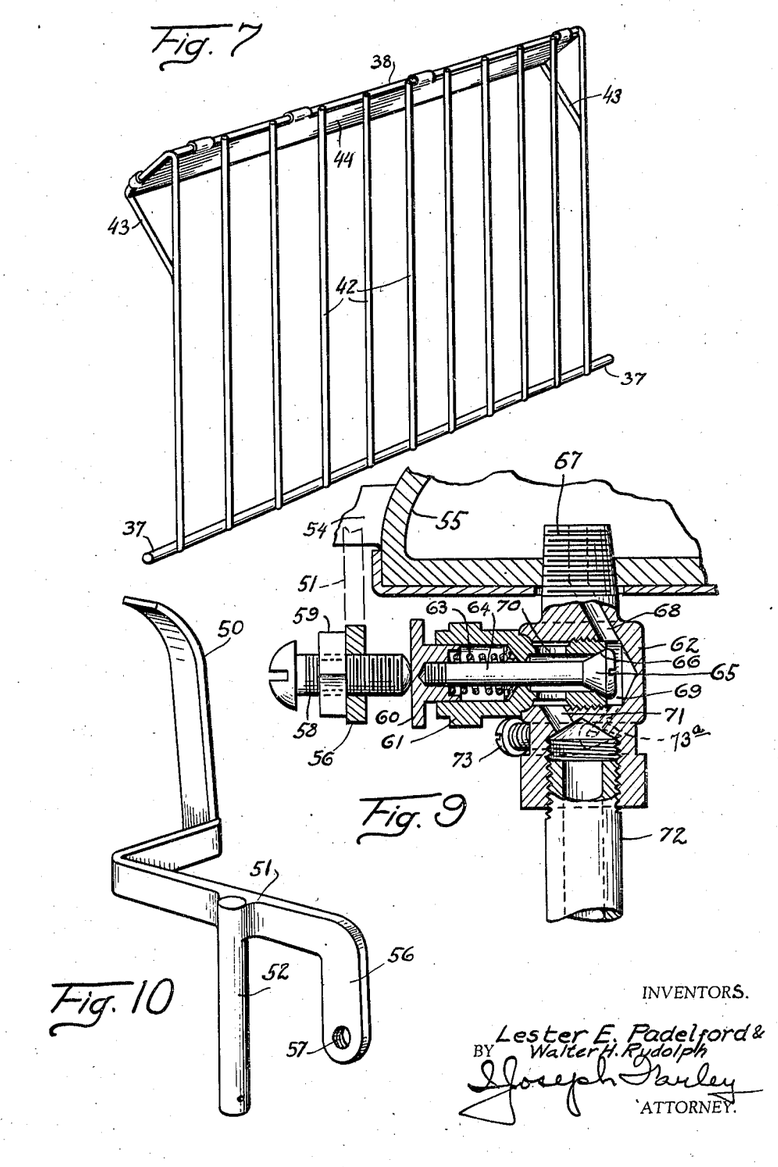
Fig. 7 is a perspective detail of one of the grids.
Fig. 9 is an enlarged sectional detail of the automatically operated fuel controlled valve.
Fig. 10 is an enlarged perspective detail of a cam lever for actuating the fuel valve.

The pin 35 at the rear end of the device is extended to engage with a cam 50 that projects upwardly from a valve actuating lever 51, the construction of which is shown most clearly in Fig. 10 of the drawings. This lever 51 is provided with a depending post 52 which is pivotally mounted within a pair of apertured ears 53, which project laterally from a small bracket 54 secured to the device in any suitable way, but which is shown as carried by the mixing chamber 55 of the fuel or gas supply line. At its end opposed to the cam 50 the lever 51 is provided with a downwardly extending portion 56 having a screw threaded aperture 57, in which is received an adjusting screw 58, (see Fig. 9), the screw 58 carrying a lock nut 59 for holding it in adjusted position.

The end of the screw 58 is adapted to engage with a flanged bushing 60 slidably mounted within a projecting boss 61 of a valve 62. Mounted within the boss 61 is a spring 63, one end of which bears against the bushing 60 to normally urge it outwardly of said boss. Threaded into the inner end of the bushing 60 is one end of a valve plunger 64 the other end of which is provided with a valve head of any suitable construction 65 adapted to engage a valve seat 66. The valve 62 is interposed at any suitable point in the fuel line leading to the burners 24. As shown the valve is screwed into the mixing chamber 55 by means of a threaded nipple 67 preferably formed integral with the casing of the valve 62. The nipple 67 is provided with a conduit 68 which communicates with a chamber 69 located adjacent to the valve seat 66. When the valve head 65 is raised from the seat 66 communication is established between the chamber 69 and a conduit 70. The latter is in communication with a conduit 71 which in turn communicates with the fuel feed pipe 72. A regulating screw 73 which at its inner end is formed as a needle valve is preferably interposed in the conduit 71 for the purpose of regulating the volume of fuel flowing through a small by-pass conduit 73a to the burners when valve 65 is in closed position and a pet-cock 74 is also preferably provided in the fuel line 72.

The upper ends of the supporting legs 20 are preferably provided with a pair of angle plates 75, see Fig. 2, that serve to support a bottom closure and deflector plate 76, said plate having a peripheral flange 77 that rests upon the angle plates 75 and a central portion that slopes downwardly towards a central aperture 78 provided in said plate. In addition to the deflector plate 76 and in order to prevent undue escape of radiant heat from the cooking compartment and, as a result, overheating of the serving platter, a second deflector plate 79 is carried by the grid carrier 31, said plate 79 resting on the rods 33 and having a pair of longitudinal slots 83 located above the aperture 78 of the bottom deflector plate 76. Extending along the longitudinal center of the plate 79 is a raised rib 84 the sides of which are preferably inclined at an angle to the radiants 23 such that heat rays from said radiants will be reflected by said ribs upwardly into the compartment. The inclination of the sides of the rib 84 also serves to deflect drippings from the food being cooked towards the slots 83. At its side edges the plate 79 is preferably turned or bent downwardly, as at 85, to limit lateral movement of the plate 79 relatively to the rods 33 and to prevent accidental displacement of the plate off the grid carrier.

Figure 3:
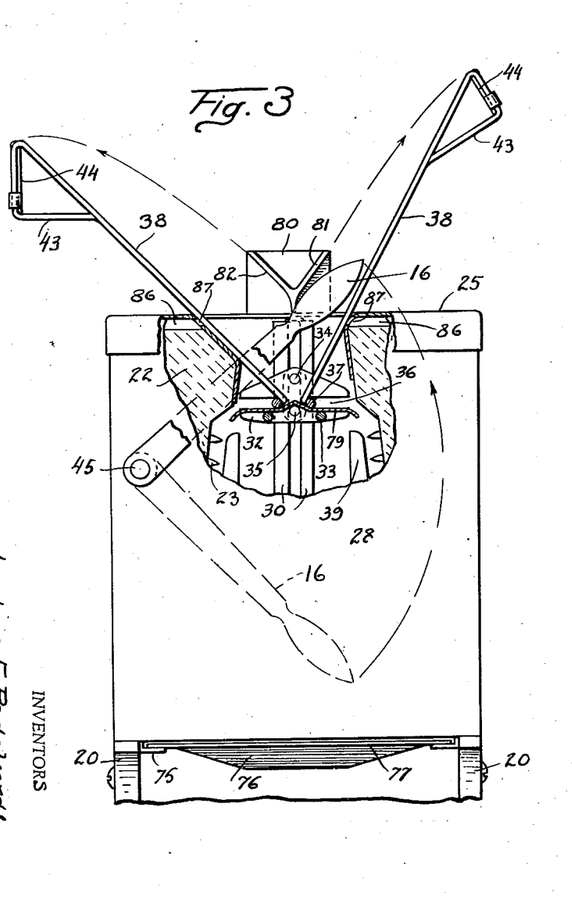
Fig. 3 is a front elevation with a portion of the outer casing broken away and parts shown in section; this figure showing the food retaining grids in their outer position.

Suitably secured to the top 25 of the outer casing is a bracket 80, see Fig. 3, having a pair of laterally projecting flanges 81 and 82 which extend over the rear upper ends of the grids 38 and serve as cams to move the upper ends of the grids away from each other when the said grids are raised out of the cooking compartment. In order to prevent overheating of the outer walls of the casing, the insulating pads 22 are preferably spaced from said walls to provide an air space 86 through which a convection current of cooling air will flow through suitable apertures 87 provided at the top and bottom of the casing; the bottom holes however are not shown but it will be understood that they may be located at any suitable places.

The manner in which the device is operated is as follows:

Let it be assumed that the grids are in their lowered position within the cooking compartment 21 as shown in Fig. 2 of the drawings, and that it is desired to broil an article of food, such as a chop. The operator will grasp the handle 16 and move the same from the dotted line position shown in Fig. 3 in the direction of the arrow to the full line position shown in said figure. As the handle is swung upwardly it will cause the shaft 45 to be rotated, thus producing a rotation of the levers 47 carried by said shaft. The free ends of the levers will be swung upwardly and their upward movement will be communicated through the links 49 and the pins 48, 35 to the brackets 32. The brackets 32 will thereby be caused to move upwardly, the pins 34, 35, sliding in the guideways 30 and holding the bracket 32 in its upward movement in a substantially horizontal position. During the upward movement of the brackets 32 the ends of the lower bars 37 of the grid members will be prevented from moving out of the slots 36 by the guide rails 39. The construction and the mounting of the grids in the grid carriers are such that they are in a condition of unstable equilibrium and as the grids are moved upwardly the upper ends of the grids will tend to fall outwardly away from each other to opened positions. The contact of the upper ends of the grids with the flanges 81, 82 of the bracket 80 will however serve to insure the opening of the grids and should there be any tendency of the grids to stick will force the upper ends of the grids outwardly away from each other and towards the sides of the device. As the movement of the grids outwardly of the cooking compartment continues, the grids will be caused to rest by gravity on the flanges 26, 27 of the top wall 25 and the opening movement of the grids away from each other will increase progressively as the carrier 31 rises to the top of the cooking compartment. When the carrier has reached its upper limit of travel, the grids 38 will be in full opened position, as shown in Fig. 3.

It will be noted that the flange 26 is located closer to the guideway 30 than the flange 27 so that the grid 38 at the right hand side (Fig. 3), when in full opened position, will occupy a more nearly vertical position than the grid at the left hand side. The purpose of this construction is to conserve space and to permit two or more broilers to be placed upon a counter or other support in more closely spaced relationship than would be possible if both grids were opened to the full extent to which the left hand grid is opened.

The operator will then place the food to be cooked between the grids, which, as shown in Fig. 3 are spaced apart a sufficiently ample distance to permit ready insertion of the said food. The operator will then swing the handle 16 downwardly from the full line position in Fig. 3 to the dotted line position. As the handle is swung downwardly the carrier 31 will be moved downwardly by the action of the levers 47 and links 49, the carrier being guided in its downward movement by the engagement of the pins 34, 35 with the guideways 30. As the carrier nears its downward limit of movement, the projecting ends of the lower bars 37 of the grids will engage with the inclined cam surfaces 41 of the plates 39 which will cause the lower ends of the grids to be moved inwardly towards each other. Simultaneously with the inward movement of the lower ends of the grids the loops 43 at the upper end of each grid will engage with the flanges 26, 27 of the top 25 and cause the upper ends of the grids also to be moved inwardly towards each other, the grids therefore moving towards each other substantially in parallelism. The food between the grids will, therefore, be automatically clamped between the vertical bars 42 of the grid and securely held in position during the cooking operation, with both vertical faces of the food exposed to the radiant heat from the radiants and equidistant therefrom.

As the grids are moved downwardly into the cooking compartment, the projecting end of the rear pin 35 will engage the cam 50 of the lever 51, thus causing said lever to be rotated about the axis of the post 52. This will cause the screw 58 carried by the projection 56 of the lever to move inwardly towards the bushing 60 and will press said bushing inwardly of the boss 61 against the action of the spring 63. As the bushing 60 moves inwardly it will carry with it the valve plunger 64 and raise the valve 65 off the valve seat 66, thereby permitting the gas or other fuel to flow from the fuel line 72 through the conduits 71 and 70 to the chamber 69 and thence through the conduit 68 to the mixing chamber 55 and thence to the burners 24.

The valve 73 may be so arranged as to permit a slight flow of gas to the burners, through the by-pass 73a at all times so that a very low flame will be maintained when the grids are out of the cooking compartment or the device may be provided with a small pilot flame.

The burners 24 are so located relatively to the radiant 23 that the flame of the burners will be directed against the lower ends of the radiants. These radiants will therefore be quickly brought to a state of incandescence and the heat radiated therefrom will be directed towards the center of the cooking compartment and on to the food contained between the grids.

It will be noted that the radiants are so inclined in the cooking compartment that they will serve to reflect the hot gases from the burner flames towards the grids 38 and the food carried thereby. The close proximity of the radiants 23 to the grids and the even distribution of the heat radiated and reflected by said radiants will insure a rapid and thorough broiling or toasting of the food carried by the grids.

The manner in which the grids are supported within the carrier 31 and the means provided for causing the grids to move inwardly towards each other are such as to cause the grids to adjust themselves automatically to the thickness of the food which they carry. The extent of movement produced by the camming action of the cams 41 and the engagement of the loops 43 with the flanges 26, 27 insures that the grids will clamp securely even the thinnest slices of bacon. If a thicker piece of food is placed between the grids the grids will move inwardly until they engage the food. But the downward movement of the grids will, of course, be checked or limited by the engagement of the grid rods 37 with the cam surfaces 41 and of the loops 43 with the flanges 26, 27 caused by the greater distance between the grids as the result of the greater thickness of the food contained between them.

In view of the fact that it requires a longer time to thoroughly cook a thicker piece of meat than a thinner piece, the invention contemplates the inclusion of means for regulating the flame of the gas burners in accordance with the thickness of the meat to be cooked. This is accomplished by making the cam portion 50 of the lever 51 so that the full movement of the lever and a full opening of the fuel supply valve 62 will be effected only when the grids containing the thinnest articles of food such as slices of bacon, have moved inwardly of the cooking compartment to their fullest possible extent. When thicker foodstuffs, such for example as a thick piece of steak is contained between the grids, the movement of the grids inwardly of the cooking compartment will be checked by the engagement between the loops 43 and ends of the rods 37 with the flanges 26, 27 and cam surfaces 41 respectively, as above described, and the extent of opening of the fuel valve and the size of the flame will, therefore, be accordingly limited.

The provision of the heat deflectors 44 in combination with the preferred construction of the heating means for the cooking compartment, such as the radiants 23 with the inclination of such radiants and the location of the burners 24 immediately below them as well as the insulation of the cooking compartment by the pads 22 of the insulating material and the end walls 29 of similar material, insures the maximum heating efficiency of the cooking compartment.

The provision of the pet-cock 74 in the fuel line, enables the operator to readily adjust the maximum amount of fuel passing through the burners whenever it is necessary because of the nature of the cooking operation or the food to vary the temperature in the cooking compartment.

The grids can be readily removed from the cooking compartment for cleaning by raising them to their uppermost limit of travel. When the grids are in this position, it will be noted that the ends of the slots 36 are above the plates 39. The grids can be removed by moving the upper end of either grid towards the center of the device, and moving the lower end of the grid towards the open end of its slots 36 thus enabling the ends of the lower bars 37 of the grids to be slipped out of the slots 36.

The bottom plate 76 of the cooking compartment may be removed for cleaning it by sliding said plate outwardly upon its supporting members 75 and plate 79 can be lifted out after the grids 76 have been removed.

In Fig. 13 of the drawings has been shown a slightly modified form for the link motion for actuating the grid carrier. In this form the end of the lever 47a lies below the connecting link 49a instead of above the same. When the grid carrier is moved to its upper position the pivotal connection 48a between the link 49a and the lever 47a is moved past center and against a small stop 100, thereby serving to lock the grid carrier in the upper position and to prevent it from accidentally dropping down into the cooking compartment. As an additional security against the accidental dropping of the grid carrier a friction pad 100a may be provided to engage the side face of the lever 47a with sufficient pressure to hold the same against movement and so that downward movement of the grids cannot be effected except by employing the leverage arm provided through the handle 16.

It will be readily understood that during the cooking of any meats or foodstuffs, such as steaks, chops, or the like, the meat juices expelled during the cooking will fall upon the plate 76 and be deflected towards the opening 78 thereof to be collected upon the serving plate inserted within the opening provided in the legs 20. The serving plate will not only collect the meat juices but will also, because of its proximity to the heated cooking compartment be warmed sufficiently for serving purposes.

As will be seen from the above, a broiler constructed in accordance with the present invention is of simple, compact and sturdy construction, particularly adapted for use in soda fountains, lunchconettes, lunch counters, etc., as well as for domestic purposes. It is of neat and attractive appearance and can be employed for the preparation of a wide variety of food stuffs. Steaks, chops and relatively thin slices of food such as bacon can be cooked with equal facility and marked rapidity. The device possesses the advantage of being simple to manipulate and due to the arrangement of burners and radiants with the latter located in close proximity to the food the thermal efficiency of the device is high and consequently it will have a minimum of fuel consumption. As the cooking compartment has but a small opening at the top thereof when the grids are lowered there will be a minimum of heat dispersed from the device into the surrounding atmosphere. No smoke dispersion into the atmosphere occurs even when steaks or chops are broiled because of the construction and arrangement of the radiants and burners for heating such radiants together with a careful regulation of the amount of air supplied to support the combustion of the heater gases. The arrangement of the radiants at an inclined angle over the burners is such as to insure complete combustion of any carbon that might tend to collect on the radiants. The location of the burners to one side of the radiants towards the center and at the bottom of the cooking compartment, results in guiding the hot gases from the burner flames past the surface of the food, but without such gases impinging directly on the food and in consequence spattering globules of fat are entirely consumed, thereby preventing such fat globules from collecting upon the radiants or other parts of the cooking compartment and obviating the objectionable smoke dispersion that ordinarily characterizes the broiling of meats with cooking compartments of the type heretofore employed. Moreover the supplying of air for supporting the combustion has been carefully proportioned to avoid an excess quantity of secondary air that would permit a lowering of the temperature in the cooking compartment sufficient to fall below the kindling temperature of the globules of grease and fat.

When the device is employed for the cooking of meats both sides of the meat will be simultaneously seared thereby preventing undue loss of the meat juices from the food and such juices as are expelled during the cooking operation will collect on the serving platter which is simultaneously warmed. The operating mechanism is very simple and of sturdy construction. There are no parts that are liable to get out of order under rough usage. No adjustments are needed on the part of the operator and consequently the device will give good service even in the hands of an inexperienced user. The grids are only exposed to the heat in the cooking compartment when the device is actually in use and are never directly exposed to the flame so that a minimum of warpage and oxidation of such grids will occur. It will be noted that with a broiler constructed in accordance with the principles of the present invention the two grid members 38 are supported upon the grid carrier in such a way as to permit a considerable extent of lateral movement of the grids towards and from each other, and that the grids are moved into clamping engagement with the foodstuffs by a translatory and not a mere pivotal movement, the movement of the grids into clamping engagement of the foodstuff being effected by the cam surfaces 41 of the guideways 39 and the engagement of the loops 43 with the flanges 26—27. This construction results in pressure being applied upon each grid at the four corners thereof, thus permitting the use of much lighter and consequently less expensive construction for the grid members as well as providing for more even pressure upon and a more effective clamping of the food. The lightness of the construction of the grids permitted by this structure is of distinct advantage in that heavy grids absorb a larger portion of the heat when the meat is first inserted into the broiler area, and moreover, the heavy grids tend to become more highly heated and to burn the food at the point of contact of the grid rods with the food, thus causing the food to stick to the grids and producing excessive smoke, and in many cases imparting a bitter taste to the food in the burned area.

While we have shown a satisfactory and practical embodiment of an invention for the purposes disclosed in this application it will be understood that the invention is not limited to the specific constructional details of such embodiment, for example, while gas has been indicated for the fuel or heating means it will be understood that any other heating means, such as electricity may be employed. Furthermore, while but a pair of grids are shown, it will be apparent that any desired number may be used and that many other changes, variations and modifications may be resorted to without departing from the spirit of the invention.

We claim:

1. In a device of the character described, a cooking compartment having an opening in the bottom thereof through which may fall the drippings from said compartment, a pair of L-shaped supporting legs for supporting said compartment on a counter or the like and in spaced relationship therewith, said legs extending downwardly from the rear of said compartment, thence forwardly in spaced relationship with one another and terminating substantially at points below the front of said compartment, the forwardly extending portions of said legs serving to support a platter in vertical alignment with said opening and in a position to catch the drippings therefrom, said legs being disposed below, on either side of, and out of vertical alignment with said opening.

2. In a device of the character described, a cooking compartment, a pair of grids mounted for translatory and pivotal movement towards and from each other, means for moving said grids, into and out of said cooking compartment, means located within said compartment, for producing a translatory movement of said grids towards each other as they are moved towards cooking position to clamp articles of foodstuff placed between the grids, and means for effecting pivotal movement of said grids automatically when the grids are moved out of the cooking compartment, whereby articles of foodstuff may be readily placed between or removed from between said grids.

3. In a device of the character described, a cooking compartment, a grid carrier comprising a pair of spaced brackets, each of said brackets having a pair of open-ended slots therein, a pair of guide-ways located one at each end of said cooking compartment, each of said brackets being provided with means for engagement with one of said guide-ways, a pair of grids having means for detachable engagement with the open ends of the slots of said brackets, and a manually operable handle located exteriorly of said casing for actuating said carrier.

4. In a device of the character described, a cooking compartment, a grid carrier movable to and from a cooking position within said compartment, a pair of grids mounted at their lower ends on said carrier in a position of normally unstable equilibrium for movement laterally towards and from each other, means for causing said grids to be moved towards each other as said carrier is moved towards said cooking position and means for causing an initial movement of said grids away from each other as said carrier is moved from said cooking position.

5. In a device of the character described, an outer casing, insulating members located within said casing at the sides thereof, partitions in said casing at the ends thereof and defining, with said insulating members, a cooking compartment, said partitions being spaced from said casing to define with said casing a pair of mechanism containing compartments, each of said partitions being provided with a guide-way, a grid carrier mounted within said cooking compartment and having at each end thereof means for engagement with said guide-ways, a manually operable handle located exteriorly of said casing, and a connection between said handle and said grid carrier housed within said mechanism receiving compartments.

6. In a device of the character described, an outer casing, insulating members located within said casing at the sides thereof, partitions in said casing at the ends thereof and defining, with said insulating members, a cooking compartment, said partitions being spaced from said casing to define, with said casing, a pair of mechanism containing housings, each of said partitions being provided with a guide-way, a grid carrier mounted within said cooking compartment and having at each end thereof means for engagement with said guide-ways, a manually operable handle located exteriorly of said casing, and connections between said handle and said grid carrier housed within said housings, said connections including a pair of operating levers and links connecting said levers to said grid carrier.

7. In a device of the character described, an outer casing, insulating members located within said casing at the sides thereof, partitions in said casing at the ends thereof and defining, with said insulating members, a cooking compartment, said partitions being spaced from said casing to define, with said casing, mechanism containing housings, each of said partitions being provided with a guide-way, a grid carrier mounted within said cooking compartment and having, at each end thereof, means for engagement with said guide-ways, a manually operable handle for moving said grid carrier towards and from a cooking position within said cooking compartment, and connections from said handle to said grid carrier located within said housings, said connections including actuating levers, links connecting said levers to said grid carrier, the centers of said connections being so disposed relatively to each other that when said grid carrier is moved to its outer limit of travel away from said cooking position, said links and levers will be thrown over center and thereby locked against accidental movement.

8. In a device of the character described, a cooking compartment having openings at the top and bottom thereof, a grid carrier movable to and from a cooking position within said compartment, a pair of grids carried by said grid carrier, a plate mounted on said grid carrier for partially closing the opening in the bottom of said compartment when said carrier is moved to said cooking position, and closure plates connected with said grids for partially closing the top opening of said cooking compartment as said carrier is moved to said cooking position.

9. In a device of the character described, a cooking compartment, heating means therefor, a grid carrier movable to and from a cooking position within said compartment, a pair of grids mounted on said carrier for lateral movement towards and from each other, means for causing said grids automatically to be moved towards each other as said carrier is moved towards said cooking position and means for regulating the extent of movement of said grids into said compartment in accordance with the thickness of the foodstuffs carried by said grids, and regulating means for said heating means having a member for engagement by said grids to cause the heating effect of said heating means to be varied directly as the thickness of said foodstuffs.

10. In a device of the character described, a cooking compartment, a grid carrier mounted for movement in said compartment towards and from a cooking position, a pair of grids mounted on said carrier for lateral movement towards and from each other and means for regulating the extent of movement of said grids into said compartment in accordance with the thickness of the foodstuffs mounted between said grids.

11. In a device of the character described, a cooking compartment, a grid carrier mounted for movement in said compartment towards and from a cooking position, a pair of grids mounted on said carrier for lateral movement towards and from each other, means for limiting the movement of said grid carrier into said compartment towards said cooking position in accordance with the thickness of the foodstuff carried by said grids, a device for heating said compartment and means connected with said device for governing the heating effect of said device automatically in accordance with the position of said grid carrier as determined by the thickness of the foodstuff carried by said grids.

LESTER E. PADELFORD.
WALTER H. RUDOLPH.